United States Patent
Dai et al.

(10) Patent No.: US 8,761,116 B2
(45) Date of Patent: Jun. 24, 2014

(54) METHOD AND SYSTEM FOR TRANSMITTING POSITION REFERENCE SIGNAL

(75) Inventors: Bo Dai, Shenzhen (CN); Guanghui Yu, Shenzhen (CN); Weijun Li, Shenzhen (CN); Yijian Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 324 days.

(21) Appl. No.: 13/257,854

(22) PCT Filed: Dec. 30, 2009

(86) PCT No.: PCT/CN2009/076298
§ 371 (c)(1),
(2), (4) Date: Dec. 16, 2011

(87) PCT Pub. No.: WO2010/145184
PCT Pub. Date: Dec. 23, 2010

(65) Prior Publication Data
US 2012/0093122 A1    Apr. 19, 2012

(30) Foreign Application Priority Data
Jun. 19, 2009   (CN) .......................... 2009 1 0150606

(51) Int. Cl.
*H04W 40/00*   (2009.01)

(52) U.S. Cl.
USPC ......................................................... 370/330

(58) Field of Classification Search
USPC ......................................................... 370/330
See application file for complete search history.

(56) References Cited

U.S. PATENT DOCUMENTS

| 2008/0316947 A1 | 12/2008 | Lindoff |
| 2009/0097447 A1* | 4/2009 | Han et al. ..................... 370/330 |
| 2009/0135803 A1 | 5/2009 | Luo et al. |
| 2010/0195566 A1* | 8/2010 | Krishnamurthy et al. .... 370/328 |

FOREIGN PATENT DOCUMENTS

| CN | 1130966 A | 9/1996 |
| CN | 101305522 A | 11/2008 |
| CN | 101459462 A | 6/2009 |
| CN | 101594336 A | 12/2009 |
| JP | 2012504561 A | 2/2012 |

(Continued)

OTHER PUBLICATIONS

Nortel, Discussions on UE positioning issues, 3GPP TSG-RAN WG1#57 R1-091911 May 4, 2009.

(Continued)

*Primary Examiner* — Kenny Lin
(74) *Attorney, Agent, or Firm* — Oppedahl Patent Law Firm LLC (57) ABSTRACT

The present disclosure discloses a method and system for transmitting a position reference signal. Wherein the method includes: frequency domain positions for transmitting a position reference signal are n physical resource blocks, and the value of n is obtained according to signaling; time domain positions for transmitting the position reference signal are the remaining orthogonal frequency division multiplexing symbols in a subframe, except for orthogonal frequency division multiplexing symbols for transmitting a physical downlink control channel and orthogonal frequency division multiplexing symbols for transmitting a cell-specific reference signal; and the position reference signal is transmitted according to the frequency domain position and the time domain position. By adopting the method and the system of the present disclosure, the transmitting of the position reference signal is realized, and the positioning precision of a UE is ensured.

21 Claims, 6 Drawing Sheets

(56) References Cited

FOREIGN PATENT DOCUMENTS

| JP | 2012518965 A | 8/2012 |
|---|---|---|
| RU | 2092902 C1 | 10/1997 |
| WO | 2004080096 A2 | 9/2004 |
| WO | 2009023792 A1 | 2/2009 |
| WO | 2010107224 A2 | 9/2010 |
| WO | 2010117116 A1 | 10/2010 |

OTHER PUBLICATIONS

LG Electronics, Investigation on Positioning Support, 3GPP TSG-RAN WG1#57 R1-092107 May 4, 2009.

Ericsson, Extension to Costas arrays for PRS pattern in normal subframes, 3GPP TSG-RAN WG1#57 R1-092007 May 4, 2009.

Alcatel-Lucent, System Configuration of OTDOA, 3GPP TSG RAN WG1 #57 R1-092142 May 4, 2009.

Ericsson, DL OTDOA framework, 3GPP TSG RAN WG1 Meeting #57 R1-092010 May 4, 2009.

International Search Report in international application No. PCT/CN2009/076298, mailed on Apr. 8, 2010.

English Translation of the Written Opinion of the International Search Authority in international application No. PCT/CN2009/076298, mailed on Apr. 8, 2010.

PRS patterns based on Modular Sonar sequence May 8, 2009.

* cited by examiner

METHOD AND SYSTEM FOR TRANSMITTING POSITION REFERENCE SIGNAL

TECHNICAL FIELD

The present disclosure relates to the field of mobile communication, and in particular, to a method and system for transmitting a position reference signal.

BACKGROUND

Orthogonal Frequency Division Multiplexing (OFDM) technology is a multicarrier modulation communication technology in essence and is one of the core technologies for the $4^{th}$ generation mobile communication. A multipath channel of an OFDM has a characteristic of frequency selective fading in a frequency domain. In order to overcome the frequency selective fading, a channel is divided into a plurality of OFDM subchannels in the frequency domain, wherein the frequency spectral characteristic of each subchannel is approximately flat, and all the subchannels are orthogonal to each other, therefore frequency spectrums of the subchannels are allowed to be overlapped with each other, thereby not only the problem of selective fading is overcome, but also the utilization degree of the frequency spectrum resource is improved.

A Long Term Evolution (LTE) system is an important program of the $3^{rd}$ Generation Partnership Project (3GPP). When the LTE system adopts a normal cyclic prefix, a time slot includes 7 uplink/downlink symbols and has a length of 7 uplink/downlink symbols, and when the LTE system adopts an extended cyclic prefix, a time slot includes 6 uplink/downlink symbols and has a length of 6 uplink/downlink symbols.

Figure 1:
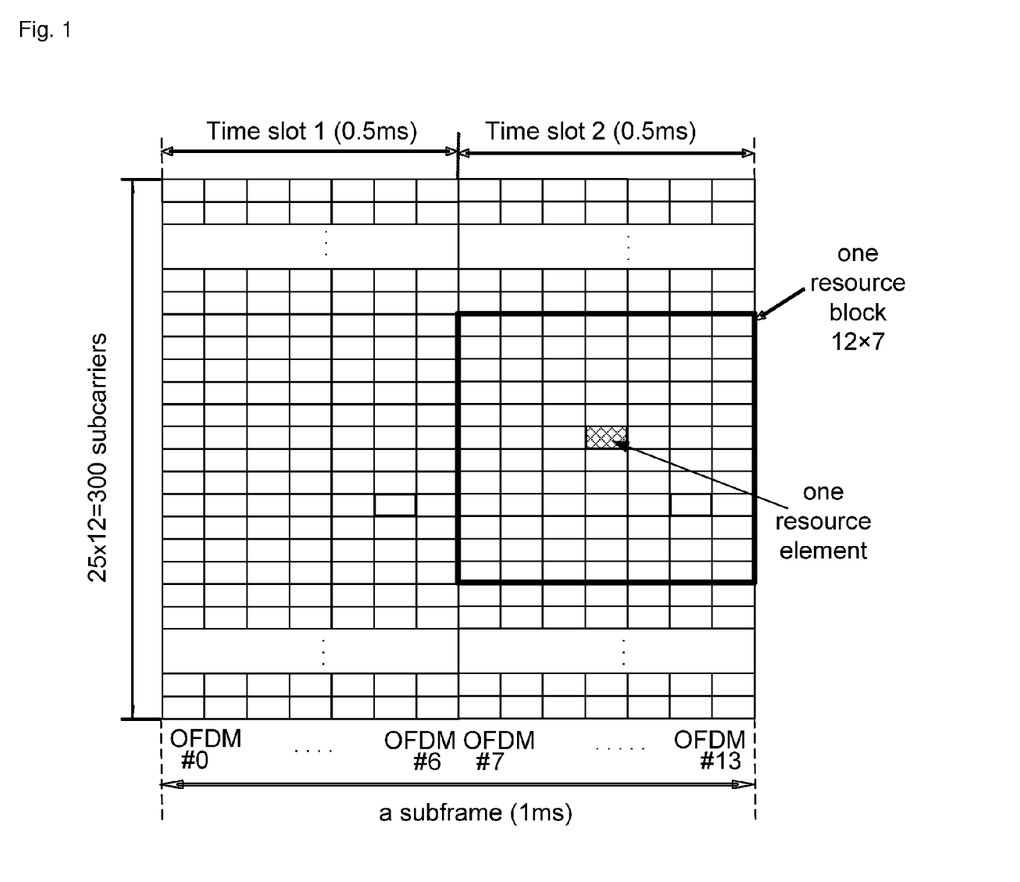
FIG. 1 is a schematic diagram illustrating a physical resource block of an LTE system with system bandwidth of 5 MHz in the relating technologies.

A Resource Element (RE) is a subcarrier on an OFDM symbol, 12 contiguous subcarriers and 7 contiguous OFDM symbols constitute a downlink Resource Block (RB) which is 180 kHz in the frequency domain and has a time length of a normal time slot in a time domain, as shown in FIG. 1. When the LTE system performs resource allocation, a resource block is taken as a basic unit for allocation. Wherein when an extended cyclic prefix is adopted, the number of contiguous OFDM symbols comprising an RB is 6.

Figure 2A:
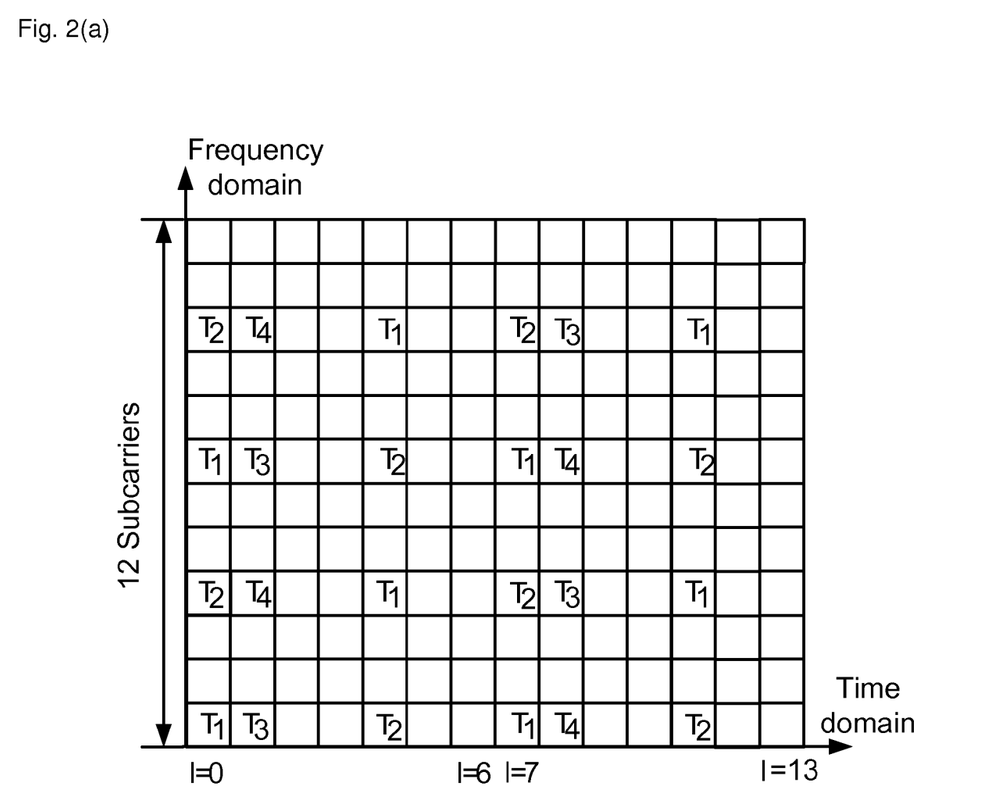
FIG. 2(a) and FIG. 2(b) are schematic diagrams illustrating the positions of a cell-specific reference signal of an LTE system in a physical source block in the relating technologies.
Figure 2B:
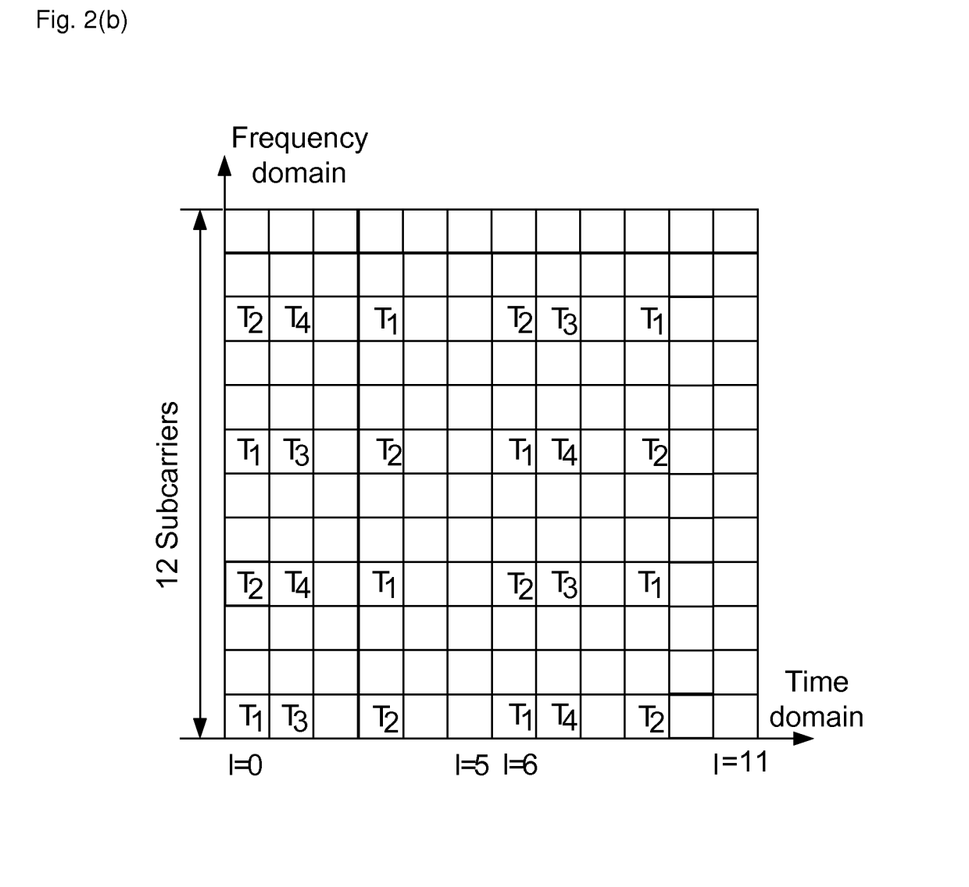

The LTE system supports the MIMO application of four antennae, and the corresponding antenna port #0, antenna port #1, antenna port #2 and antenna port #3 respectively adopt a method of full bandwidth Cell-Specific Reference Signals (CRSs). When the cyclic prefix is a normal cyclic prefix, the positions of these cell-specific reference signals in a physical resource block are shown in FIG. 2(a). When the cyclic prefix is an extended cyclic prefix, the positions of these cell-specific reference signals in a physical resource block are shown in FIG. 2(b). In FIG. 2(a) and FIG. 2(b), the horizontal coordinate 1 represents a sequence number of a subframe on an OFDM symbol.

In addition, a UE-specific reference signal is also provided, which is transmitted only in the time-frequency domain position where a UE-specific Physical Downlink Shared Channel (PDSCH) is located. Wherein the functions of the cell-specific reference signal include quality measurement for downlink channel and downlink channel estimation, i.e., the quality measurement and demodulation for a downlink channel.

A base station needs to measure the position of User Equipment (UE) in a cell, so that it can perform effective configuration and scheduling for the UE. At present, the CRS is adopted for measuring the terminal, thus some limitations exist as follows:

(1) CRS sequence repeats in each frame, so the mutual correlation is poor;

(2) when the transmission is performed with two antennae, the maximum multiplexing factor is 3, and the interference between the adjacent cells is large;

(3) the CRS power is semi-static configured, so the positioning performance is limited.

At present, a solution used to solve the above problems is to position the UE by transmitting a Position Reference Signal (PRS), and thus ensure the positioning precision of the UE. However, in the existing technologies, only the physical resource which uses a resource block as a unit to transmit a position reference signal is defined, and the positions in all the resource blocks where the position reference signal is transmitted are the same, whereas as for how to transmit the position reference signal, such as transmitting the resource block index of the position reference signal, the specific time-frequency position in the resource block, and the sequence of the reference signal and the like. No specific solution has been provided yet.

For this reason, it is urgent to provide a specific method for transmitting a position reference signal in the industry to ensure the positioning precision of the UE.

SUMMARY

The technical problem to be solved in the present disclosure is to provide a method for transmitting a position reference signal to ensure the positioning precision of UE.

In order to solve the above technical problem, the present disclosure provides a method for transmitting a position reference signal, the method comprises the following:

frequency domain positions for transmitting a position reference signal are n physical resource blocks, and the value of n is obtained according to signaling;

time domain positions for transmitting the position reference signal are remaining orthogonal frequency division multiplexing symbols in a subframe except for orthogonal frequency division multiplexing symbols for transmitting a physical downlink control channel and orthogonal frequency division multiplexing symbols for transmitting a cell-specific reference signal; and the position reference signal is transmitted using the frequency domain position and the time domain position.

Preferably, the method may further comprise a process of determining orthogonal frequency division multiplexing symbols used for transmitting the position reference signal in the frequency domain position and the time domain position; wherein the process may specifically comprise the following:

an array A of an N×N common sequence is determined, wherein A=[$a_0, a_1, a_2, \ldots, a_i, \ldots, a_{N-1}$], both columns and rows are numbered respectively from 0, N elements different with each other are included in the array A, the value of each element is an integer ranged from 0 to N−1, and $a_i$ represents that an element in the $a_i^{th}$ row of the $i^{th}$ column is 1, and elements in the other positions in the $i^{th}$ column are 0;

when the identity of a cell is $N_{ID}^{cell}$, an index of the subframe for transmitting the cell-specific reference signal is determined as SubframeIndex, then an N×N array B=[$b_0, b_1, b_2, \ldots, b_i, \ldots, b_{N-1}$] corresponding to the cell $N_{ID}^{cell}$ is:

$h = X \bmod N, p = \text{floor}(X/N), b_i = (a_{(i+h) \bmod N} + p) \bmod N, i = 0, 1, 2, \ldots, N-1;$ or $p = X \bmod N, h = \text{floor}(X/N), b_i = (a_{(i+h) \bmod N} + p) \bmod N, i = 0, 1, 2, \ldots, N-1;$ wherein x mod y represents an operation for calculating a remainder, floor (x) represents a rounding down operation, and $X=N_{ID}^{cell}$ or $X=N_{ID}^{cell}+SubframeIndex$;

the number of the orthogonal frequency division multiplexing symbols for transmitting the position reference signal in the subframe is determined to be n, and the first n columns or the first n rows of the array B are chosen, or the last n columns or the last n rows of the array B are chosen;

there is a one-to-one corresponding correlation between the chosen n columns or n rows and the n orthogonal frequency division multiplexing symbols, and a position where the element 1 in each column or each row is located corresponds to a position of a subcarrier where the position reference signal is located on a corresponding orthogonal frequency division multiplexing symbol in each physical resource block for transmitting the position reference signal.

Preferably, the physical resource blocks may be n physical resource blocks which are discrete at equal intervals or n contiguous physical resource blocks.

Preferably, the n physical resource blocks which are discrete at equal intervals may be numbered with r, r+k, r+2×k, ..., r+(n-1)×k respectively, wherein r may represent the starting position of the n physical resource blocks which are discrete at equal intervals, and k may represent an interval between two adjacent physical resource blocks.

Preferably, when the resource block corresponding to a current downlink bandwidth is m and all the physical resource blocks may be numbered from 0, r=0, k=$\lfloor m/n \rfloor$; wherein $\lfloor x \rfloor$ may represent a rounding down operation.

Preferably, the n contiguous physical resource blocks may be n contiguous physical resource blocks starting from a low frequency, or n contiguous physical resource blocks with zero frequency as the center, n contiguous physical resource blocks with high frequency as a cut-off or n contiguous physical resource blocks obtained according to a notification of the signaling.

Preferably, all the available physical resource blocks may be numbered from 0 according to an order of from low frequency to high frequency, and the last one may be numbered with r; and the n contiguous physical resource blocks starting from the low frequency may be n contiguous physical resource blocks numbered from 0 to n−1;

as to the n contiguous physical resource blocks with the zero frequency as their center, a zero-frequency subcarrier may be located at the center of the n contiguous physical resource blocks, and the n contiguous physical resource blocks may comprise 12 n contiguous subcarriers, i.e., 6 n subcarriers of the low frequency adjacent to zero frequency and 6 n subcarriers of the high frequency adjacent to zero frequency;

the n contiguous physical resource blocks with high frequency as a cut-off may be n contiguous physical resource blocks numbered from r−n+1 to r.

Preferably, the number n and the starting position of the physical resource blocks may be obtained according to one or two signaling.

Preferably, when the resource block corresponding to a current downlink bandwidth may be m, then the values of n may be 1, 5, 10 and 20; or 6, 12, 25 and 50; or 10, 20, 40 and m; or 2, 5, 10 and 20; or 5, 10, 20 and 40; or $\lfloor m/6 \rfloor$, $\lfloor m/4 \rfloor$, $\lfloor m/2 \rfloor$ and m; or $\lfloor m/12 \rfloor$, $\lfloor m/6 \rfloor$, $\lfloor m/3 \rfloor$ and m; wherein $\lfloor x \rfloor$ represents a rounding down operation.

Preferably, in a Multimedia Broadcasting Single Frequency Network (MBSFN) subframe, the time domain positions for transmitting the position reference signal may be 10 contiguous orthogonal frequency division multiplexing symbols which are from the third one to the last one in the MBSFN subframe.

Preferably, in a non-MBSFN subframe for transmitting the position reference signal, the number of the orthogonal frequency division multiplexing symbols for transmitting the physical downlink control channel may be 2, and an antenna port of a base station may be 4 or 2.

Preferably, when a system adopts a normal cyclic prefix, the time domain positions for transmitting the position reference signal may be the third, fourth, sixth and seventh orthogonal frequency division multiplexing symbols, as well as the tenth, eleventh, thirteenth and fourteenth orthogonal frequency division multiplexing symbols in the non-MBSFN subframe; or the time domain positions for transmitting the position reference signal may be the third, fourth, sixth and seventh orthogonal frequency division multiplexing symbols, as well as the ninth, tenth, eleventh, thirteenth and fourteenth orthogonal frequency division multiplexing symbols in the non-MBSFN subframe.

Preferably, when a system adopts an extended cyclic prefix, the time domain positions for transmitting the position reference signal may be the third, fifth and sixth orthogonal frequency division multiplexing symbols, as well as the ninth, eleventh and twelfth orthogonal frequency division multiplexing symbols in the non-MBSFN subframe; or, the time domain positions for transmitting the position reference signal may be the third, fifth and sixth orthogonal frequency division multiplexing symbols, as well as the eighth, ninth, eleventh and twelfth orthogonal frequency division multiplexing symbols in the non-MBSFN subframe.

Preferably, in each physical resource block for transmitting the position reference signal, only one subcarrier on the orthogonal frequency division multiplexing symbol for transmitting the position reference signal may be used for transmitting the position reference signal.

Preferably, the position reference signal may be a pseudo-random sequence, which is first mapped to a corresponding physical resource block in the frequency domain and then mapped to the corresponding physical resource block in the time domain.

In order to solve the above technical problem, the present disclosure further provides a system for transmitting a position reference signal, the system comprises a transmitting unit configured to transmit a position reference signal using a frequency domain position and a time domain position; wherein the frequency domain positions for transmitting the position reference signal are n physical resource blocks, and the value of n is obtained according to signaling;

the time domain positions for transmitting the position reference signal are remaining orthogonal frequency division multiplexing symbols in a subframe except for orthogonal frequency division multiplexing symbols for transmitting a physical downlink control channel and orthogonal frequency division multiplexing symbols for transmitting a cell-specific reference signal.

Preferably, the system may further comprise a determining unit configured to determine an orthogonal frequency division multiplexing symbols used for transmitting the position reference signal in the frequency domain position and the time domain position; wherein the determining may specifically comprises the following:

an array A of an N×N common sequence is determined, wherein $A=[a_0, a_1, a_2, \ldots, a_i, \ldots, a_{N-1}]$, both columns and rows are numbered from 0, N elements different with each other are included in the array A, a value of each element is an integer ranged from 0 to N−1, and $a_i$ represents that an element in the $a_i^{th}$ row of the $i^{th}$ column is 1, and elements in the other positions in the $i^{th}$ column are 0;

when the identity of a cell is $N_{ID}^{cell}$, an index of the subframe for transmitting the cell-specific reference signals are determined as SubframeIndex, then an N×N array $B=[b_0, b_1, b_2, \ldots, b_i, \ldots, b_{N-1}]$ corresponding to the cell $N_{ID}^{cell}$ may be:

$h=X \bmod N, p=\text{floor}(X/N), b_i=(a_{(i+h) \bmod N}+p) \bmod N, i=0,1,2,\ldots,N-1$; or $p=X \bmod N, h=\text{floor}(X/N), b_i=(a_{(i+h) \bmod N}+p) \bmod N, i=0,1,2,\ldots,N-1$;

wherein x mod y represents an operation for calculating a remainder, floor (x) represents a rounding down operation, and $X=N_{ID}^{cell}$ or $X=N_{ID}^{cell}+\text{SubframeIndex}$;

the number of the orthogonal frequency division multiplexing symbols for transmitting the position reference signal in the subframe is determined to be n, and the first n columns or the first n rows of the array B are chosen, or the last n columns or the last n rows of the array B are chosen;

there is a one-to-one corresponding correlation between the chosen n columns or n rows and the n orthogonal frequency division multiplexing symbols, and the position where the element 1 in each column or each row is located corresponds to the position of a subcarrier where the position reference signal is located on a corresponding orthogonal frequency division multiplexing symbol in each physical resource block for transmitting the position reference signal.

In order to solve the above technical problems, the present disclosure also provides a method for transmitting a position reference signal, the method comprises:

a corresponding index value is allocated to a combination of a period and its corresponding subframe offset which are used for transmitting a position reference signal, and a corresponding correlation of the combination and the corresponding index value is established;

frequency domain positions for transmitting the position reference signal are n physical resource blocks, and the value of n is obtained according to signaling; time domain positions for transmitting the position reference signal are remaining orthogonal frequency division multiplexing symbols in a subframe expect for orthogonal frequency division multiplexing symbols for transmitting a physical downlink control channel and orthogonal frequency division multiplexing symbols for transmitting a cell-specific reference signal;

the position reference signal is transmitted according to the established corresponding correlation, the allocated index value, the frequency domain position and the time domain position.

Preferably, the method may further comprise the following:

the combination and the corresponding index value and the corresponding correlation are respectively stored in a base station and a terminal;

after configuring the period and the corresponding subframe offset of the position reference signal, the base station determines the index value according to the corresponding correlation and transmits the index value to the terminal.

Preferably, the method may further comprise the following:

the terminal obtains the period and the corresponding subframe offset of the position reference signal which are configured by the base station according to the received index value and the corresponding correlation, and receives the position reference signal transmitted by the base station according to the obtained period and the subframe offset.

Preferably, the period may include {16, 32, 64, 128} ms or {16, 32, 64, 128, OFF} ms; wherein OFF represents that positioning function is turned off;

when the period is 16 ms, a value of the subframe offset is an integer ranged from 0 to 15;

when the period is 32 ms, a value of the subframe offset is an integer ranged from 0 to 31;

when the period is 64 ms, a value of the subframe offset is an integer ranged from 0 to 63;

when the period is 128 ms, a value of the subframe offset is an integer ranged from 0 to 127;

when the period is OFF, the subframe offset is a default value.

Preferably, when the period is 16 ms, combinations of the period and the corresponding subframe offset may be {16, 0}, {16, 1}, {16, 2}, ..., {16, 14}, {16, 15}, and the corresponding index values may be respectively 0 to 15 in sequence;

when the period is 32 ms, combinations of the period and the corresponding subframe offset may be {32, 0}, {32, 1}, {32, 2}, ..., {32, 30}, {32, 31}, and the corresponding index values may be respectively 16 to 47 in sequence;

when the period is 64 ms, combinations of the period and the corresponding subframe offset may be {64, 0}, {64, 1}, {64, 2}, ..., {64, 62}, {64, 63}, and the corresponding index values may be respectively 48 to 111 in sequence;

when the period is 128 ms, combinations of the period and the corresponding subframe offset may be {128, 0}, {128, 1}, {128, 2}, ..., {128, 126}, {128, 127}, and the corresponding index values may be respectively 112 to 239 in sequence;

when the period is OFF, a combination of the period and the corresponding subframe offset may be {OFF, default value}, and the corresponding index value may be 240.

In order to solve the above technical problems, the present disclosure also provides a system for transmitting a position reference signal, the system comprises a transmitting unit configured to transmit a position reference signal according to an established corresponding correlation, an allocated index value, a frequency domain position and a time domain position; wherein a corresponding index value is allocated for a combination of a period and corresponding subframe offset which are used for transmitting a position reference signal, and a corresponding correlation is established for the combination and the corresponding index value;

the frequency domain positions for transmitting the position reference signal are n physical resource blocks, and the value of n is obtained according to signaling; the time domain positions for transmitting the position reference signal are the remaining orthogonal frequency division multiplexing symbols in a subframe except for orthogonal frequency division multiplexing symbols for transmitting a physical downlink control channel and orthogonal frequency division multiplexing symbols for transmitting a cell-specific reference signal.

Preferably, the system may further comprise a storing unit and an index value transmitting unit; wherein the storing unit is configured to respectively store the combination and the corresponding index value and the corresponding correlation in a base station and a terminal;

the index value transmitting unit is configured to determine the index value according to the corresponding correlation and transmit the index value to the terminal.

Preferably, the system may further comprise a receiving unit, which is used by the terminal for obtaining the period and the corresponding subframe offset of the position reference single which are configured by the base station according to the received index value and the corresponding correlation, and used for receiving the position reference signal transmitted by the base station according to the obtained period and subframe offset.

Compared with the relating technologies, the technical solution of the present disclosure makes the time-frequency positions for transmitting the position reference signal in the adjacent cells different, thereby reducing the interference between cells, ensuring the positioning precision of the UE and Improving the overall performance of the system. In addition, the present disclosure also provides a technical solution for a transmitting period of a position reference signal and the subframe offset when the position reference signal is transmitted.

DETAILED DESCRIPTION

In the following description, the present disclosure will be described in detail in combination with the accompanying drawings and embodiments, so that those skilled in the art can fully understand the realization process that how the present disclosure solves the technical problem using the technical means and achieves the technical effect, and can implement the present disclosure according to the realization process.

In the technical solution of the present disclosure, frequency domain positions for transmitting a position reference signal are n physical resource blocks, wherein the value of n is obtained according to a notification of the signaling. Here, the above physical resource block only represents the frequency domain position of the position reference signal.

The n physical resource blocks can be n physical resource blocks which are discrete at equal intervals, i.e., the n physical resource blocks correspond to the n physical resource blocks numbered with r, r+k, r+2×k, . . . , r+(n−1)×k, wherein r represents the starting position number of the n physical resource blocks, and k represents an interval between two adjacent physical resource blocks. The resource block corresponding to the current downlink bandwidth is set to be m, all the physical resource blocks are numbered from 0, and then, r=0, and k=$\lfloor m/n \rfloor$, wherein $\lfloor x \rfloor$ represents a rounding down operation.

The n physical resource blocks can also be n contiguous physical resource blocks, such as, n contiguous physical resource blocks starting from low frequency, or can be n contiguous physical resource blocks with zero frequency as the center, or can also be n contiguous physical resource blocks with high frequency as a cut-off. The value of n is obtained according to a notification of signaling, and the signaling overhead can be 2 bits.

The n contiguous physical resource blocks can also be n contiguous physical resource blocks obtained according to a notification of signaling; and the starting position of the n contiguous physical resource blocks can be obtained together according to the signaling and can also be obtained according to other signalings. When one signaling is adopted for notifying the number (namely n) and the starting position of the physical resource blocks, the signaling overhead is $\lceil \log_2 (N_{RB}^{DL}(N_{RB}^{DL}+1)/2) \rceil$, wherein $N_{RB}^{DL}$ represents the number of the resource blocks corresponding to the downlink bandwidth.

The corresponding correlation is as follows: for example, all the available physical resource blocks are numbered from 0 according to an order of from low frequency to high frequency, the last number is r, and then, the n contiguous physical resource blocks starting from low frequency are n contiguous physical resource blocks numbered from 0 to n−1;

as to the n contiguous physical resource blocks with zero frequency as the center, a zero frequency subcarrier is located at the center of the n contiguous physical resource blocks, and the n contiguous physical resource blocks comprise 12 n contiguous subcarriers, i.e., 6 n subcarriers of low frequency adjacent to zero frequency and 6 n subcarriers of high frequency adjacent to zero frequency;

the n contiguous physical resource blocks with high frequency as a cut-off are n contiguous physical resource blocks which are numbered from r−n+1 to r with r as the cut-off number of the physical resource block.

For example, if the resource blocks corresponding to the current downlink bandwidth is m, then the values of n corresponding to the signaling of 2 bits are 1, 5, 10 and 20; or 6, 12, 25 and 50; or 10, 20, 40 and m; or 2, 5, 10 and 20; or 5, 10, 20 and 40; or $\lfloor m/6 \rfloor$, $\lfloor m/4 \rfloor$, $\lfloor m/2 \rfloor$ and m; or $\lfloor m/12 \rfloor$, $\lfloor m/6 \rfloor$, $\lfloor m/3 \rfloor$ and m.

Time domain positions for transmitting the position reference signal are remaining OFDM symbols in a subframe, except for OFDM symbols for transmitting a physical downlink control channel and OFDM symbols for transmitting a cell-specific reference signal.

Further, in a Multimedia Broadcasting Single Frequency Network (MBSFN) subframe, the time domain positions for transmitting the position reference signal are ten contiguous OFDM symbols which are from the third OFDM signal to the last OFDM symbol in the MBSFN subframe.

In a general subframe (non-MBSFN subframe), when the system adopts a normal cyclic prefix, the time domain positions for transmitting the position reference signal are the third, fourth, sixth and seventh OFDM symbols, as well as the tenth, eleventh, thirteenth and fourteenth OFDM symbols in the subframe; or the time domain positions for transmitting the position reference signal are the third, fourth, sixth and seventh OFDM symbols, as well as the ninth, tenth, eleventh, thirteenth and fourteenth OFDM symbols in the subframe.

In a general subframe (non-MBSFN subframe), when the system adopts an extended cyclic prefix, the time domain positions for transmitting the position reference signal are the third, fifth and sixth OFDM symbols, as well as the ninth, eleventh and twelfth OFDM symbols in the subframe; or the time domain positions for transmitting the position reference signal are the third, fifth and sixth OFDM symbols, as well as the eighth, ninth, eleventh and twelfth OFDM symbols in the subframe.

That is to say, in the general subframe (non-MBSFN subframe), the number of the OFDM symbols for transmitting the physical downlink control channel is 2 in a subframe for transmitting the position reference signal, and the current antenna port of the base station is 4 antenna port; or in the general subframe (non-MBSFN subframe), the number of the OFDM symbols for transmitting the physical downlink control channel is 2 in a subframe for transmitting the position reference signal, and the current antenna port of the base station is 2 antenna port.

Further, in each resource block for transmitting the position reference signal, only one subcarrier on an OFDM symbol for transmitting the position reference signal is used for transmitting the position reference signal.

Further, the sequence of the position reference signal is a pseudo-random sequence, which is first mapped to a corresponding physical resource block in the frequency domain and then mapped to the corresponding physical resource block in the time domain.

An index value is allocated to each combination of a period and corresponding subframe offset which are used for transmitting the position reference signal, a corresponding correlation is established between the index value and the combination of the period and the corresponding subframe offset which are used for transmitting the position reference signal, and the corresponding correlation is stored on both sides of a base station and a terminal, and the index value and the combination of the period and the subframe offset are also stored.

After configuring for the terminal the period and the corresponding subframe offset which are used for transmitting the position reference signal, the base station can determine corresponding index value according to the information of the corresponding correlation and then transmits the index value to the terminal. The terminal can obtain the period and the subframe offset which are used for transmitting the position reference signal and configured by the base station according to the stored corresponding correlation and the index value, and can finish the receiving of the position reference signal according to the obtained period and subframe offset.

The period of transmitting the position reference signal can be {16, 32, 64, 128} ms, and can also be {16, 32, 64, 128, OFF} ms, wherein OFF represents that the positioning function is turned off, i.e., positioning is not performed.

When the period of transmitting the position reference signal is 16 ms, the value of the subframe offset for transmitting the position reference signal is an integer ranged from 0 to 15, there are 16 combinations of the constituted {period, subframe offset}, i.e., {16, 0}, {16, 1}, {16, 2}, ..., {16, 14} and {16, 15}, and the corresponding index values are respectively 0 to 15 in sequence.

When the period of transmitting the position reference signal is 32 ms, the value of the subframe offset for transmitting the position reference signal is an integer ranged from 0 to 31, there are 32 combinations of the constituted {period, subframe offset}, i.e., {32, 0}, {32, 1}, {32, 2}, ..., {32, 30} and {32, 31}, and the corresponding index values are respectively 16 to 47 in sequence.

When the period of transmitting the position reference signal is 64 ms, the value of the subframe offset for transmitting the position reference signal is an integer ranged from 0 to 63, there are 64 combinations of the constituted {period, subframe offset}, i.e., {64, 0}, {64, 1}, {64, 2}, ..., {64, 62} and {64, 63}, and the corresponding index values are respectively 48 to 111 in sequence.

When the period of transmitting the position reference signal is 128 ms, the value of the subframe offset for transmitting the position reference signal is an integer ranged from 0 to 127, there are 128 combinations of the constituted {period, subframe offset}, i.e., {128, 0}, {128, 1}, {128, 2}, ..., {128, 126} and {128, 127}, and the corresponding index values are respectively 112 to 239 in sequence.

If the period of transmitting the position reference signal also includes OFF, the corresponding subframe offset can be a default value, the index value corresponding to the constituted combination of {period, subframe offset}, i.e., {OFF, default value} is 240.

The specific corresponding correlation between the index value and the combination of the period and the subframe offset which are used for transmitting the position reference signal is shown in Table 1 or Table 2:

TABLE 1

| Index Value $I_{PRS}$ | Period (ms) | Subframe Offset |
| --- | --- | --- |
| 0-15 | 16 | $I_{PRS}$ |
| 16-47 | 32 | $I_{PRS}-16(0-31)$ |
| 48-111 | 64 | $I_{PRS}-48(0-63)$ |
| 112-239 | 128 | $I_{PRS}-112(0-127)$ |
| 240 | OFF | Default Value- |
| 241-255 | Reserved | Reserved |

TABLE 2

| Index Value $I_{PRS}$ | Period (ms) | Subframe Offset |
| --- | --- | --- |
| 0-15 | 16 | $I_{PRS}$ |
| 16-47 | 32 | $I_{PRS}-16(0-31)$ |
| 48-111 | 64 | $I_{PRS}-48(0-63)$ |
| 112-239 | 128 | $I_{PRS}-112(0-127)$ |
| 240-255 | Reserved | Reserved |

The period and the subframe offset which are used for transmitting the position reference signal can be respectively notified by adopting different signalings.

In addition, the position reference signal can be sent on h contiguous downlink subframes, and the value of h can be 1, 2, 4 or 6 and is obtained according to signaling.

The base station transmits to the terminal configuration information related to the position reference signal and then transmits the position reference signal in the corresponding time-frequency position, and then the terminal detects the position reference signal according to the received configuration information and finishes positioning according to the detected position reference signal.

In the following description, the technical features of the present disclosure will be clearly described by using mathematical expressions.

If an array A of an N×N common sequence is assumed, and A=[$a_0, a_1, a_2, \ldots, a_i, \ldots, a_{N-1}$], both columns and rows are numbered from 0, N elements different with each other are included in the array A, the value of each element is an integer ranged from 0 to N−1, wherein $a_i$ represents that the element in the $a_i^{th}$ row of the $i^{th}$ column is 1, and elements in the other positions in the $i^{th}$ column are 0.

When the identity of a cell is $N_{ID}^{cell}$, an index of the subframe for transmitting the reference signal is SubframeIndex, and then an N×N array B=[$b_0, b_1, b_2, \ldots, b_i, \ldots, b_{N-1}$] corresponding to the cell $N_{ID}^{cell}$ is:

$$h = X \bmod N \qquad \text{formula (1)}$$

$$p = \text{floor}(X/N) \qquad \text{formula (2)}$$

$$b_i = (a_{(i+h) \bmod N} + p) \bmod N, i=0,1,2,\ldots,N-1 \qquad \text{formula (3)}$$

or $$p = X \bmod N \qquad \text{formula (4)}$$

$$h = \text{floor}(X/N) \qquad \text{formula (5)}$$

$$b_i = (a_{(i+h) \bmod N} + p) \bmod N, i=0,1,2,\ldots,N-1 \qquad \text{formula (6)}$$

wherein

X mod y represents a reminder operation;

floor (X) represents a rounding down operation;

$X=N_{ID}^{cell}$, or $X=N_{ID}^{cell}+SubframeIndex$.

On each OFDM symbol for transmitting the position reference signal, only one subcarrier is used for transmitting the position reference signal data, and as to the position of the subcarrier for transmitting the position reference signal in the resource block, it is generated by the array B.

For example, if subcarriers in a resource block are numbered from 0 to 11, according to the number n of the OFDM symbols for transmitting the position reference signal in the subframe, the first n columns or the first n rows of the array B are chosen, or the last n columns or the last n rows of the array B are chosen.

There is one-to-one corresponding correlation between the chosen n columns or n rows and the n OFDM symbols, and the position where the element 1 in each column or each row is located corresponds to the position of a subcarrier on a corresponding OFDM symbol in the resource block, where the position reference signal is located. That is, in the chosen array, if the element 1 is assumed to be located in the $j^{th}$ row in the $i^{th}$ column (or in the $j^{th}$ column in the $i^{th}$ row), the position reference signal is accordingly located on the $j^{th}$ subcarrier on the corresponding OFDM symbol k in the $i^{th}$ column (or on the $j^{th}$ subcarrier on the corresponding OFDM symbol k in the $i^{th}$ row) in the chosen array.

The First Embodiment

In the embodiment, a position reference signal configured through signaling is sent in the full bandwidth, that is, the position reference signal is transmitted on each resource block, and the time-frequency position of the position reference signal in each resource block is the same.

In an MBSFN subframe, the time domain positions for transmitting the position reference signal are ten contiguous OFDM symbols in the MBSFN subframe which are from the third OFDM symbol to the last OFDM symbol in the subframe.

When the array A is [1, 3, 7, 4, 5, 2, 10, 9, 12, 8, 6, 11], the cell identity $N_{ID}^{cell}$ is 1, N=12, $X=N_{ID}^{cell}$, and then, $h=N_{ID}^{cell} \mod 12$;

$p=floor(N_{ID}^{cell}/12)$;

$b_i=(a_{(i+h) \mod N}+p) \mod N, i=0,1,2,\ldots,N-1$;

i.e., $B=[b_0,b_1,b_2,\ldots,b_{N-1}]$;

it is obtained that:

B=[3, 7, 4, 5, 2, 10, 9, 12, 8, 6, 11, 1].

Figure 3:
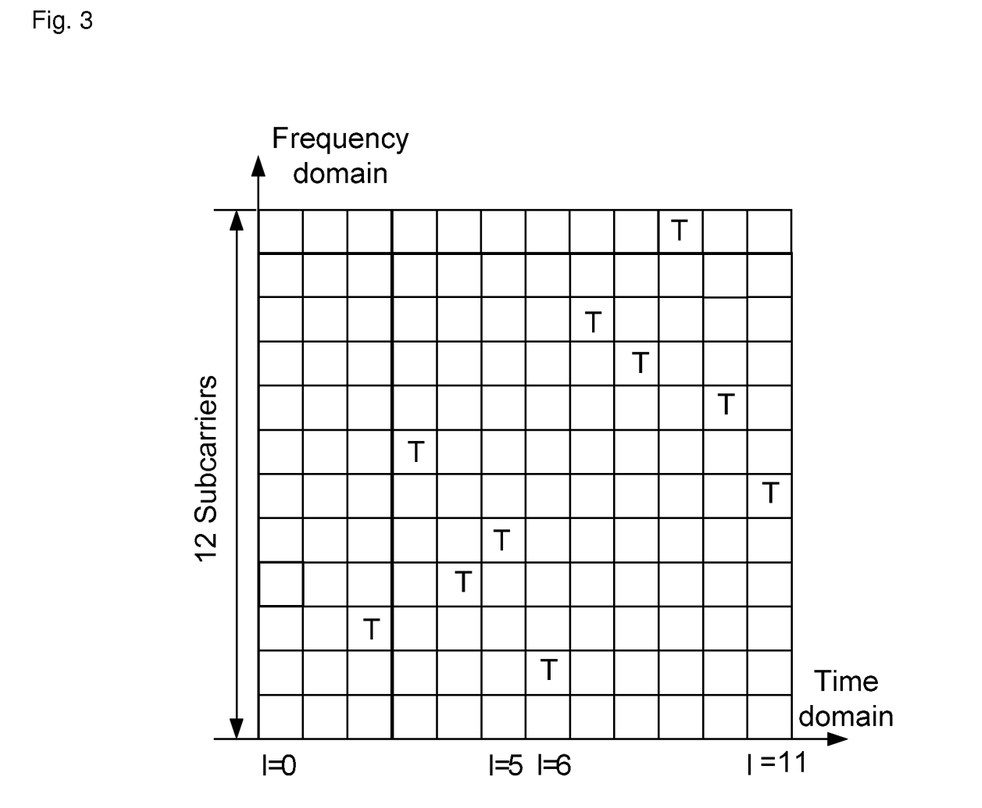
FIG. 3 to FIG. 5 are schematic diagrams illustrating specific positions of carriers in a resource block where position reference signals are located according to the first embodiment to the third embodiment of the present disclosure.

In the MBSFN subframe, the first 10 columns in the array are chosen, the specific positions of the corresponding position reference signals in the resource block is shown in FIG. 3, wherein the symbol T represents the position of the subcarrier where the position reference signal is located. The abscissa 1 shown in FIG. 3 represents the sequence number of the subframe on the OFDM symbol.

The Second Embodiment

In the embodiment, a position reference signal configured through signaling is sent in the full bandwidth, that is, the position reference signal is sent on each resource block, and the time-frequency position of the position reference signal in each resource block is the same.

When the system adopts a normal cyclic prefix, the time domain positions for transmitting the position reference signal are the third, fourth, sixth and seventh OFDM symbols, as well as the tenth, eleventh, thirteenth and fourteenth OFDM symbols in the subframe.

When the array A is [1, 3, 7, 4, 5, 2, 10, 9, 12, 8, 6, 11], the cell identity $N_{ID}^{cell}$ is 1, N=12, $X=N_{ID}^{cell}$, and then, $h=N_{ID}^{cell} \mod 12$;

$p=floor(N_{ID}^{cell}/12)$;

$b_i=(a_{(i+h) \mod N}+p) \mod N, i=0,1,2,\ldots,N-1$;

i.e., $B=[b_0,b_1,b_2,\ldots,b_{N-1}]$;

it is obtained that:

B=[3, 7, 4, 5, 2, 10, 9, 12, 8, 6, 11, 1].

Figure 4:
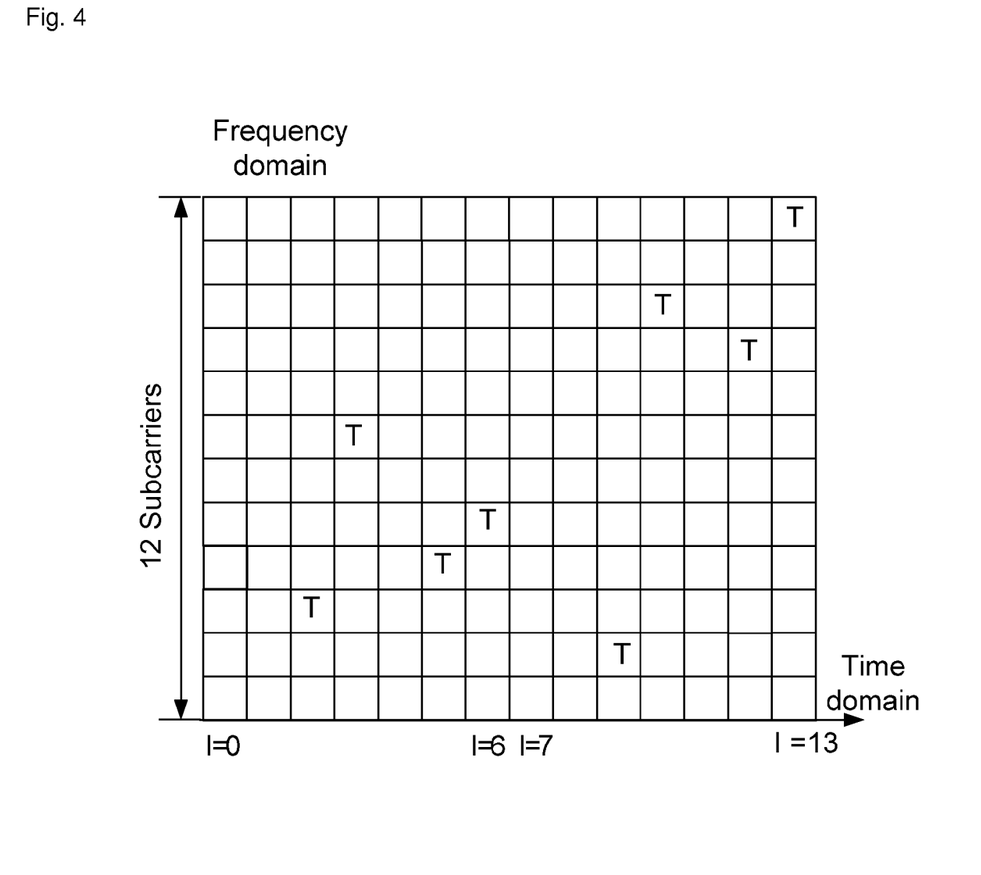

When the system adopts a normal cyclic prefix, the first 8 columns in the array are chosen, and the specific positions of the corresponding position reference signals in the resource block is shown in FIG. 4. The abscissa 1 shown in FIG. 4 represents the sequence number of the subframe on the OFDM symbol.

The Third Embodiment

In the embodiment, a position reference signal configured through signaling is sent in the full bandwidth, that is, the position reference signal is sent on each resource block, and the time-frequency position of the position reference signal in each resource block is the same.

When the system adopts an extended cyclic prefix, the time domain positions for transmitting the position reference signal are the third, fifth and sixth OFDM symbols, as well as the ninth, eleventh and twelfth OFDM symbols in the subframe.

When the array A is [1, 3, 7, 4, 5, 2, 10, 9, 12, 8, 6, 11], the cell identity $N_{ID}^{cell}$ is 1, N=12, $X=N_{ID}^{cell}$, and then, $h=N_{ID}^{cell} \mod 12$;

$p=floor(N_{ID}^{cell}/12)$;

$b_i=(a_{(i+h) \mod N}+p) \mod N, i=0,1,2,\ldots,N-1$;

i.e., $B=[b_0,b_1,b_2,\ldots,b_{N-1}]$;

it is obtained that:

B=[3, 7, 4, 5, 2, 10, 9, 12, 8, 6, 11, 1].

Figure 5:
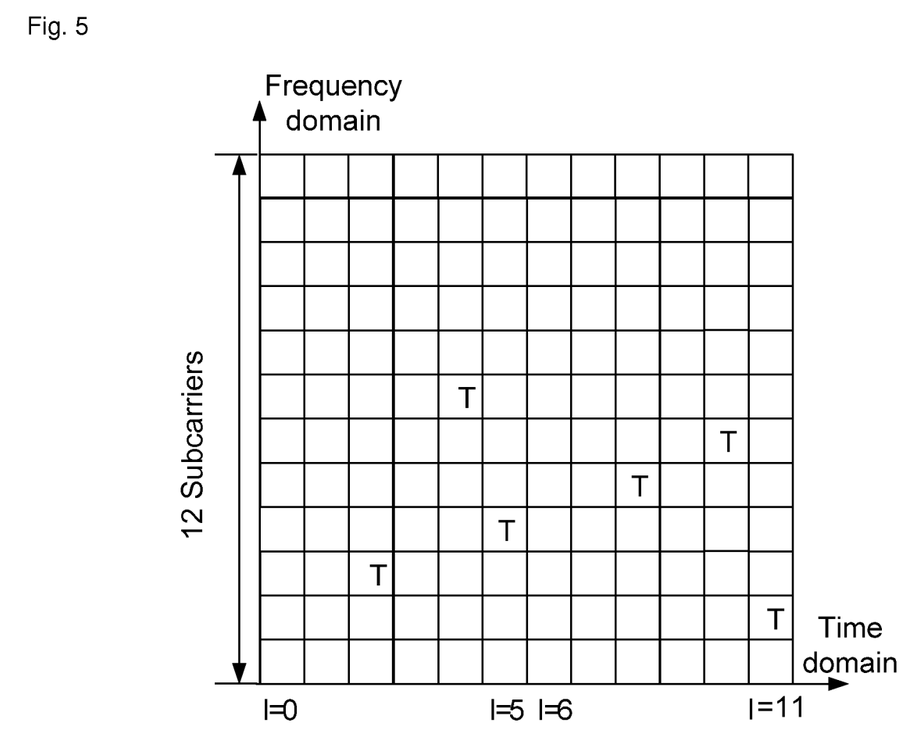

When the system adopts an extended cyclic prefix, the first six columns in the array are chosen, and the specific positions of the corresponding position reference signals in the resource block are shown in FIG. 5. The abscissa 1 in FIG. 5 represents the sequence number of the subframe on the OFDM symbol.

The value of the common sequence A can be [1, 3, 7, 4, 5, 2, 10, 9, 12, 8, 6, 11], and can also be [1, 2, 5, 10, 12, 7, 8, 11, 4, 6, 3, 9], [1, 2, 4, 8, 5, 10, 9, 7, 3, 6] or [1, 2, 8, 11, 10, 4, 7, 12, 5, 3, 9, 6].

It needs to state that the above three embodiments only describe the time-frequency positions in a resource block without referring to the position of the physical resource block, and the physical resource block is taken as full bandwidth for description, therefore, the selection modes of the above-mentioned three physical resource blocks are not involved.

The present disclosure provides a system for transmitting a position reference signal, and the system comprises a transmitting unit configured to transmit a position reference signal according to a frequency domain position and a time domain position.

Wherein the frequency domain positions for transmitting the position reference signal are n physical resource blocks, and the value of n is obtained according to signaling. The time domain positions for transmitting the position reference signal are the remaining orthogonal frequency division multiplexing symbols in a subframe except for orthogonal frequency division multiplexing symbols for transmitting a physical downlink control channel and orthogonal frequency division multiplexing symbols for transmitting a cell-specific reference signal.

Preferably, the system further comprises a determining unit configured to determine an orthogonal frequency division multiplexing symbol used for transmitting the position reference signal in the frequency domain position and the time domain position; wherein the determining specifically comprise the following:

an array A of an N×N common sequence is determined, wherein A=[$a_0, a_1, a_2, \ldots, a_i, \ldots, a_{N-1}$], both columns and rows are numbered from 0, N elements different with each other are included in the array A, the value of each element is an integer ranged from 0 to N−1, and $a_i$ represents that the element in the $a_i^{th}$ row of the $i^{th}$ column is 1, and the elements in the other positions in the $i^{th}$ column are 0;

when the identity of a cell is $N_{ID}^{cell}$, an index of the subframe for transmitting the cell-specific reference signal is determined as SubframeIndex, then an N×N array B=[$b_0, b_1, b_2, \ldots, b_i, \ldots, b_{N-1}$] corresponding to the cell $N_{ID}^{cell}$ is:

$$h=X \bmod N, p=\text{floor}(X/N), b_i=(a_{(i+h) \bmod N}+p) \bmod N, i=0,1,2,\ldots,N-1; \text{ or}$$

$$p=X \bmod N, h=\text{floor}(X/N), b_i=(a_{(i+h) \bmod N}+p) \bmod N, i=0,1,2,\ldots,N-1;$$

wherein x mod y represents an operation for calculating a remainder, floor (X) represents a rounding down operation, and $X=N_{ID}^{cell}$ or $X=N_{ID}^{cell}+\text{SubframeIndex}$;

the number of the orthogonal frequency division multiplexing symbols for transmitting the position reference signal in the subframe is determined to be n, and then the first n columns or the first n rows of the array B are chosen, or the last n columns or the last n rows of the array B are chosen;

There is one-to-one corresponding correlation between the chosen n columns or n rows and the n orthogonal frequency division multiplexing symbols, and the position where the element 1 in each column or each row is located corresponds to the position of a subcarrier where the position reference signal is located on a corresponding orthogonal frequency division multiplexing symbol in each physical resource block for transmitting the position reference signal.

The present disclosure also provides a system for transmitting a position reference signal, and the system comprises a transmitting unit configured to transmit a position reference signal according to an established corresponding correlation, an allocated index value, a frequency domain position and a time domain position.

Wherein a corresponding index value is allocated for a combination of a period and corresponding subframe offset which are used for transmit the position reference signal, and a corresponding correlation for the combination and the corresponding index value is established; the frequency domain positions for transmitting the position reference signal are n physical resource blocks, and the value of n is obtained according to signaling; the time domain positions for transmitting the position reference signal are the remaining orthogonal frequency division multiplexing symbols in a subframe expect for orthogonal frequency division multiplexing symbols for transmitting a physical downlink control channel and orthogonal frequency division multiplexing symbols for transmitting a cell-specific reference signal.

Preferably, the system further comprises a storing unit and an index value transmitting unit. Wherein the storing unit is configured to store the combination and the corresponding index value and the corresponding correlation respectively in a base station and a terminal. The index value transmitting unit is configured to determine the index value according to the corresponding correlation and transmit the index value to the terminal.

Preferably, the system further comprises a receiving unit, which is used by the terminal for obtaining the period and the corresponding subframe offset of the position reference signal which are configured by the base station according to the received index value and the corresponding correlation, and used for receiving the position reference signal sent by the base station according to the obtained period and subframe offset.

The above description is only the illustrating embodiments of the present disclosure, which is not used to limit the present disclosure. To those skilled in the art, various modifications and changes can be made from the present disclosure. Any modification, equivalent substitution and improvement etc, made within the spirit and principle of the present disclosure, shall be within the protection scope of the appended claims of the present disclosure.

What is claimed is:

1. A method for transmitting a position reference signal, the method comprising:
   frequency domain positions for transmitting a position reference signal being n physical resource blocks, and the value of n being obtained according to signaling;
   time domain positions for transmitting the position reference signal being a remaining orthogonal frequency division multiplexing symbols in a subframe except for orthogonal frequency division multiplexing symbols for transmitting a physical downlink control channel and orthogonal frequency division multiplexing symbols for transmitting a cell-specific reference signal; and
   the position reference signal being transmitted according to the frequency domain position and the time domain position,
   wherein the physical resource blocks are n physical resource blocks which are discrete at equal intervals or n contiguous physical resource blocks;
   wherein the n physical resource blocks which are discrete at equal intervals are numbered with r, r+k, r+2×k, ..., r+(n−1)×k respectively, wherein r represents the starting position of the n physical resource blocks which are discrete at equal intervals, and k represents an interval between two adjacent physical resource blocks;
   wherein the n contiguous physical resource blocks is n contiguous physical resource blocks starting from a low frequency, or n contiguous physical resource blocks with zero frequency as their center, or n contiguous physical resource blocks with high frequency as a cutoff, or n contiguous physical resource blocks obtained according to a notification of the signaling.

2. The method according to claim 1, further comprising: a process of determining the orthogonal frequency division multiplexing symbol used for transmitting the position reference signal in the frequency domain position and the time domain position; wherein the process specifically comprises the following:

an array A of an N×N common sequence is determined, wherein A=[$a_0, a_1, a_2, \ldots, a_i, \ldots, a_{N-1}$], both columns and rows are numbered respectively from 0, N elements different with each other are included in the array A, the value of each element is an integer ranged from 0 to N−1, and $a_i$ represents that an element in the $a_i^{th}$ row of the $i^{th}$ column is 1, and elements in the other positions in the $i^{th}$ column are 0;

when the identity of a cell is $N_{ID}^{cell}$, a subframe index for transmitting the cell-specific reference signal being determined as SubframeIndex, then an N×N array B=[$b_0, b_1, b_2, \ldots, b_i, \ldots, b_{N-1}$] corresponding to the cell $N_{ID}^{cell}$ is:

$h = X \bmod N, p = \text{floor}(X/N), b_i = (a_{(i+h) \bmod N} + p) \bmod N, i=0,1,2,\ldots,N-1;$ or $p = X \bmod N, h = \text{floor}(X/N), b_i = (a_{(i+h) \bmod N} \cdot p) \bmod N, i=0, 1,2,\ldots,N-1;$ wherein x mod y represents an operation for calculating a remainder, floor (x) represents a rounding down operation, and $X = N_{ID}^{cell}$ or $X = N_{ID}^{cell} + \text{SubframeIndex}$;

the number of the orthogonal frequency division multiplexing symbols for transmitting the position reference signal in the subframe is determined to be n, and the first n columns or the first n rows of the array B are chosen, or the last n columns or the last n rows are chosen;

there being one-to-one corresponding correlation between the chosen n columns or n rows and the n orthogonal frequency division multiplexing symbols, and a position where the element 1 in each column or each row is located corresponds to a position of a subcarrier where the position reference signal is located on a corresponding orthogonal frequency division multiplexing symbol in each physical resource block for transmitting the position reference signal.

3. The method according to claim 2, wherein in a Multimedia Broadcasting Single Frequency Network (MBSFN) subframe, the time domain position for transmitting the position reference signal are ten contiguous orthogonal frequency division multiplexing symbols which are from the third one to the last one in the MBSFN subframe.

4. The method according to claim 2, wherein
in a non-MBSFN subframe for transmitting the position reference signal, the number of the orthogonal frequency division multiplexing symbols for transmitting the physical downlink control channel is 2, and an antenna port of a base station is 4 or 2.

5. The method according to claim 2, wherein
in each physical resource block for transmitting the position reference signal, only one subcarrier on the orthogonal frequency division multiplexing symbol for transmitting the position reference signal is used for transmitting the position reference signal.

6. The method according to claim 2, wherein
the position reference signal is a pseudo-random sequence, which is first mapped to a corresponding physical resource block in a frequency domain and then mapped to the corresponding physical resource block in a time domain.

7. The method according to claim 1, wherein
when the physical resource blocks are n physical resource blocks which are discrete at equal intervals, and when a resource block corresponding to a current downlink bandwidth is m, all the physical resource blocks are numbered from 0, r=0, k=$\lfloor m/n \rfloor$; wherein $\lfloor x \rfloor$ represents a rounding down operation.

8. The method according to claim 1, wherein
when the physical resource blocks are n contiguous physical resource blocks, all the available physical resource blocks are numbered from 0 according to an order from low frequency to high frequency, and the last one is numbered with r;

the n contiguous physical resource blocks starting from the low frequency are specifically n contiguous physical resource blocks numbered from 0 to n−1;

as to the n contiguous physical resource blocks with the zero frequency as their center, a zero-frequency subcarrier is located at the center of the n contiguous physical resource blocks, and the n contiguous physical resource blocks comprise 6 n subcarriers of the low frequency adjacent to zero frequency and 6 n subcarriers of the high frequency adjacent to zero frequency;

the n contiguous physical resource blocks with high frequency cutoff are n contiguous physical resource blocks numbered from r−n+1 to r.

9. The method according to claim 1, wherein
when the physical resource blocks are n contiguous physical resource blocks, the number n and the starting position of the physical resource blocks are obtained according to one or two signaling.

10. The method according to claim 1, wherein
in a Multimedia Broadcasting Single Frequency Network (MBSFN) subframe, the time domain positions for transmitting the position reference signal are ten contiguous orthogonal frequency division multiplexing symbols which are from the third one to the last one in the MBSFN subframe.

11. The method according to claim 1, wherein
in a non-MBSFN subframe for transmitting the position reference signal, the number of the orthogonal frequency division multiplexing symbols for transmitting the physical downlink control channel is 2, and an antenna port of a base station is 4 or 2.

12. The method according to claim 1, wherein
in each physical resource block for transmitting the position reference signal, only one subcarrier on the orthogonal frequency division multiplexing symbol for transmitting the position reference signal is used for transmitting the position reference signal.

13. The method according to claim 1, wherein
the position reference signal is a pseudo-random sequence, which is first mapped to a corresponding physical resource block in a frequency domain and then mapped to the corresponding physical resource block in a time domain.

14. A system for transmitting a position reference signal, the system comprising: a transmitting unit configured to transmit a position reference signal using a frequency domain position and a time domain position;

wherein the frequency domain position for transmitting the position reference signal are n physical resource blocks, and the value of n is obtained according to signaling;

the time domain positions for transmitting the position reference signal are a remaining orthogonal frequency division multiplexing symbol in a subframe except for orthogonal frequency division multiplexing symbols for transmitting a physical downlink control channel and orthogonal frequency division multiplexing symbols for transmitting a cell-specific reference signal, wherein the physical resource blocks are n physical resource blocks which are discrete at equal intervals or n contiguous physical resource blocks;

wherein the n physical resource blocks which are discrete at equal intervals are numbered with r, r+k, r+2×k, . . . , r+(n−1)×k respectively, wherein r represents the starting position of the n physical resource blocks which are discrete at equal intervals, and k represents an interval between two adjacent physical resource blocks;

wherein the n contiguous physical resource blocks is n contiguous physical resource blocks starting from a low frequency, or n contiguous physical resource blocks with zero frequency as their center, or n contiguous physical resource blocks with high frequency as a cut-off, or n contiguous physical resource blocks obtained according to a notification of the signaling.

15. The system according to claim 14, further comprising: a determining unit configured to determine an orthogonal frequency division multiplexing symbol used for transmitting the position reference signal in the frequency domain position and the time domain position; wherein the determining comprises the following:

an array A of an N×N common sequence is determined, wherein A=[$a_0, a_1, a_2, \ldots, a_i, \ldots, a_{N-1}$], both columns and rows are numbered respectively from 0, N elements different with each other are included in the array A, a value of each element is an integer ranged from 0 to N−1, and $a_i$ represents that an element in the $a_i^{th}$ row of the $i^{th}$ column is 1, and elements in the other positions in the $i^{th}$ column are 0;

when the identity of a cell is $N_{ID}^{cell}$, a subframe index for transmitting the cell-specific reference signal being determined as SubframeIndex, then an N×N array B=[$b_0, b_1, b_2, \ldots, b_i, \ldots, b_{N-1}$] corresponding to the cell $N_{ID}^{cell}$ is:

$$h=X \bmod N, p=\mathrm{floor}(X/N), b_i=(a_{(i+h) \bmod N}+p) \bmod N, i=0,1,2,\ldots,N-1;\text{ or}$$

$$p=X \bmod N, h=\mathrm{floor}(X/N), b_i=(a_{(i+h) \bmod N}+p) \bmod N, i=0,1,2,\ldots,N-1;$$

wherein x mod y represents an operation for calculating a remainder, floor (x) represents a rounding down operation, and $X=N_{ID}^{cell}$ or $X=N_{ID}^{cell}+$SubframeIndex;

the number of the orthogonal frequency division multiplexing symbols for transmitting the position reference signal in the subframe is determined to be n, and the first n columns or the first n rows of the array B are chosen, or the last n columns or the last n rows of the array B are chosen;

there is a one-to-one corresponding correlation between the chosen n columns or n rows and the n orthogonal frequency division multiplexing symbols, and the position where the element 1 in each column or each row is located corresponds to a position of a subcarrier where the position reference signal is located on a corresponding orthogonal frequency division multiplexing symbol in each physical resource block for transmitting the position reference signal.

16. A method for transmitting a position reference signal, the method comprising:

a corresponding index value being allocated to a combination of a period and its corresponding subframe offset which are used for transmitting a position reference signal, and a corresponding correlation of the combination and the corresponding index value being established; after configuring the period and the corresponding subframe offset of the position reference signal, the base station determining the index value according to the corresponding correlation and transmitting the index value to the terminal;

frequency domain positions for transmitting the position reference signal being n physical resource blocks, and the value of n being obtained according to signaling; time domain positions for transmitting the position reference signal being remaining orthogonal frequency division multiplexing symbols in a subframe expect for orthogonal frequency division multiplexing symbols for transmitting a physical downlink control channel and orthogonal frequency division multiplexing symbols for transmitting a cell-specific reference signal;

the position reference signal being transmitted according to the established corresponding correlation, the allocated index value, the frequency domain position and the time domain position.

17. The method according to claim 16, further comprising: the combination and the corresponding index value and the corresponding correlation being respectively stored in a base station and a terminal.

18. The method according to claim 17, further comprising: the terminal obtaining the period and the corresponding subframe offset of the position reference signal which are configured by the base station according to the received index value and the corresponding correlation, and receiving the position reference signal transmitted by the base station according to the obtained period and the subframe offset.

19. A system for transmitting a position reference signal, the system comprising: a transmitting unit configured to transmit a position reference signal according to an established corresponding correlation, an allocated index value, a frequency domain position and a time domain position;

wherein a corresponding index value is allocated for a combination of a period and a corresponding subframe offset which are used for transmitting a position reference signal, and a corresponding correlation for the combination and the corresponding index value are established;

the frequency domain positions for transmitting the position reference signal are n physical resource blocks, and the value of n being obtained according to signaling; the time domain positions for transmitting the position reference signal are remaining orthogonal frequency division multiplexing symbols in a subframe expect for orthogonal frequency division multiplexing symbols for transmitting a physical downlink control channel and orthogonal frequency division multiplexing symbols for transmitting a cell-specific reference signal;

wherein the system further comprises an index value transmitting unit, configured to determine the index value according to the corresponding correlation and transmit the index value to the terminal.

20. The system according to claim 19, further comprising: a storing unit, configured to store the combination and the corresponding index value and the corresponding correlation respectively in a base station and a terminal;

the index value transmitting unit is configured to determine the index value according to the corresponding correlation and transmit the index value to the terminal.

21. The system according to claim 20, further comprising a receiving unit, which is used by the terminal for obtaining the period and the corresponding subframe offset of the position reference signal which are configured by the base station according to the received index value and the corresponding correlation, and used for receiving the position reference signal transmitted by the base station according to the obtained period and subframe offset.

\* \* \* \* \*